June 15, 1954  C. F. SCHNUCK ET AL  2,680,879
ROTOR FOR BLENDERS

Filed Feb. 5, 1952  2 Sheets-Sheet 1

INVENTOR
Carl F. Schnuck
and Warren C. Whitten
BY
Rockwell & Bartholow
ATTORNEYS June 15, 1954

C. F. SCHNUCK ET AL 2,680,879

ROTOR FOR BLENDERS

Filed Feb. 5, 1952

INVENTOR
Carl F. Schnuck
and Warren S. Whittum
BY
Rockwell & Bartholow
ATTORNEYS Patented June 15, 1954

2,680,879

UNITED STATES PATENT OFFICE 2,680,879

ROTOR FOR BLENDERS

Carl F. Schnuck, North Haven, and Warren C. Whittum, Ansonia, Conn., assignors to Farrel-Birmingham Company, Incorporated, Ansonia, Conn., a corporation of Connecticut Application February 5, 1952, Serial No. 269,952

8 Claims. (Cl. 18—12)

This invention relates to a blending machine, and more particularly to a device of this character in which materials may be blended or mixed by a continuous extrusion process, the operation applying particularly to plastic materials.

In the rubber industry, as well as in connection with other plastic substances, it is necessary that the constituents, which are combined to form the final material from which sheets or other products are made, be mixed and blended together with thoroughness, and that they be subjected at the same time to intense mechanical working both to effect the mixing or blending operation and to generate heat in order that they may be brought to the proper condition for sheeting or some other form of work which is to be performed upon the final material.

The working or kneading operation is performed under considerable pressure so that heat is developed in the material in the blending and mixing process, and in some instances heat is applied to the chamber in which the material is worked, the chamber being provided with a jacket for this purpose.

It is contemplated by the present invention to effect an intense mechanical working of a plastic mass within a chamber in a continuous extrusion process as distinguished from those processes in which a batch of material is worked in a mixing chamber and then discharged from the chamber and a new batch added. It will be obvious that a continuously operating machine has many advantages over one of the intermittent or "batch" type. It has been found difficult in some instances to obtain the desired results from a continuously operating machine as when the material passes through the machine continuously in one direction it is sometimes not worked or kneaded to a sufficient extent to develop the necessary mechanical heat nor to bring about the desired blending, mixing or plasticizing effect.

According to the present invention, while the material travels generally in a continuously forward path through the machine, means are provided for providing communication between adjacent channels through which the material flows so that there will be a progressive intermixing or cross mixing of the material in one channel with that in another channel to obtain a more thorough blending of the constituent parts of the mass.

As illustrated, the material is drawn into the blending chamber through a hopper by means of a screw or scroll feed, and the feeding threads are so constructed that the material will be more effectively drawn into the chamber and will not tend to regurgitate within the hopper. Also, as shown, the material is extruded from the chamber at the end thereof distant from the hopper through a relatively narrow slot so that it emerges as a strip although the particular shape of the discharged product is, of course, subject to variation and the material may be discharged in any form which is appropriate considering the use to which it is to be put. It is, however, customary to provide a relatively restricted opening so that there will be a considerable pressure developed within the chamber which will add to the thoroughness of the mixing action.

The results are obtained in the present instance by providing an elongated chamber through which the material is passed and providing in that chamber a rotor having at the end adjacent the hopper a feed screw consisting of a plurality of threads or blades provided with serrations or notches to bite into the material to draw it into the chamber and propel it lengthwise thereof toward the discharge opening. The threads of this part of the rotor have a relatively short lead so that they exert a considerable propelling force.

Upon that end of the rotor adjacent the discharge openings are provided blades or threads of a different type. Preferably, however, the number of these blades will be the same as that of the feeding threads so that the latter may merge into these mixing blades. Between these mixing blades are channels through which the material is propelled, these channels being separated by the ridges of the helical blades. Transverse grooves or notches are cut in these ridges to provide communication between one channel and the adjacent channel, these notches being also cut on a spiral or angle to the axis of the rotor, the angle, however, being smaller than that of the blades so that they cross or cut through the ridges of the latter to allow the material in one channel to pass into the next adjacent channel to some extent. Thus, notwithstanding the fact that the material in the chamber is moved continuously in a forward direction, a thorough blending action is effected, and as the material is always traveling forwardly, the device is self-cleaning in that at the end of an operation no part of the material will tend to remain in the machine to be intermixed with the next batch which might be a material of a different kind.

One object of the invention is to provide a new and improved mixing and blending device for plastic materials.

A further object of the invention is to provide a device of the character described comprising an elongated chamber having a rotor therein, the rotor being provided with convex mixing or blending spirally arranged blades to propel the material through the chamber, the blades being so formed as to provide communication between the channels on opposite sides thereof.

A still further object of the invention is to provide a machine for blending and mixing plastic materials comprising a chamber and a bladed rotor, the blades upon the rotor being helically or spirally arranged to force the material through the chamber in the channels between the blades and being so constructed to permit transfer of material from one channel to the next adjacent channel, and thus obtain a more thorough blending and mixing motion.

A still further object of the invention is to provide a machine for mixing or blending plastic material of the class described in which the chamber is provided with a feed hopper, and the rotor is provided adjacent the hopper with propelling means for the material and with means to bite into the charge of material and draw it into the chamber.

To these and other ends the invention consists in the novel features and combinations of parts to be hereinafter described and claimed.

Figure 1:
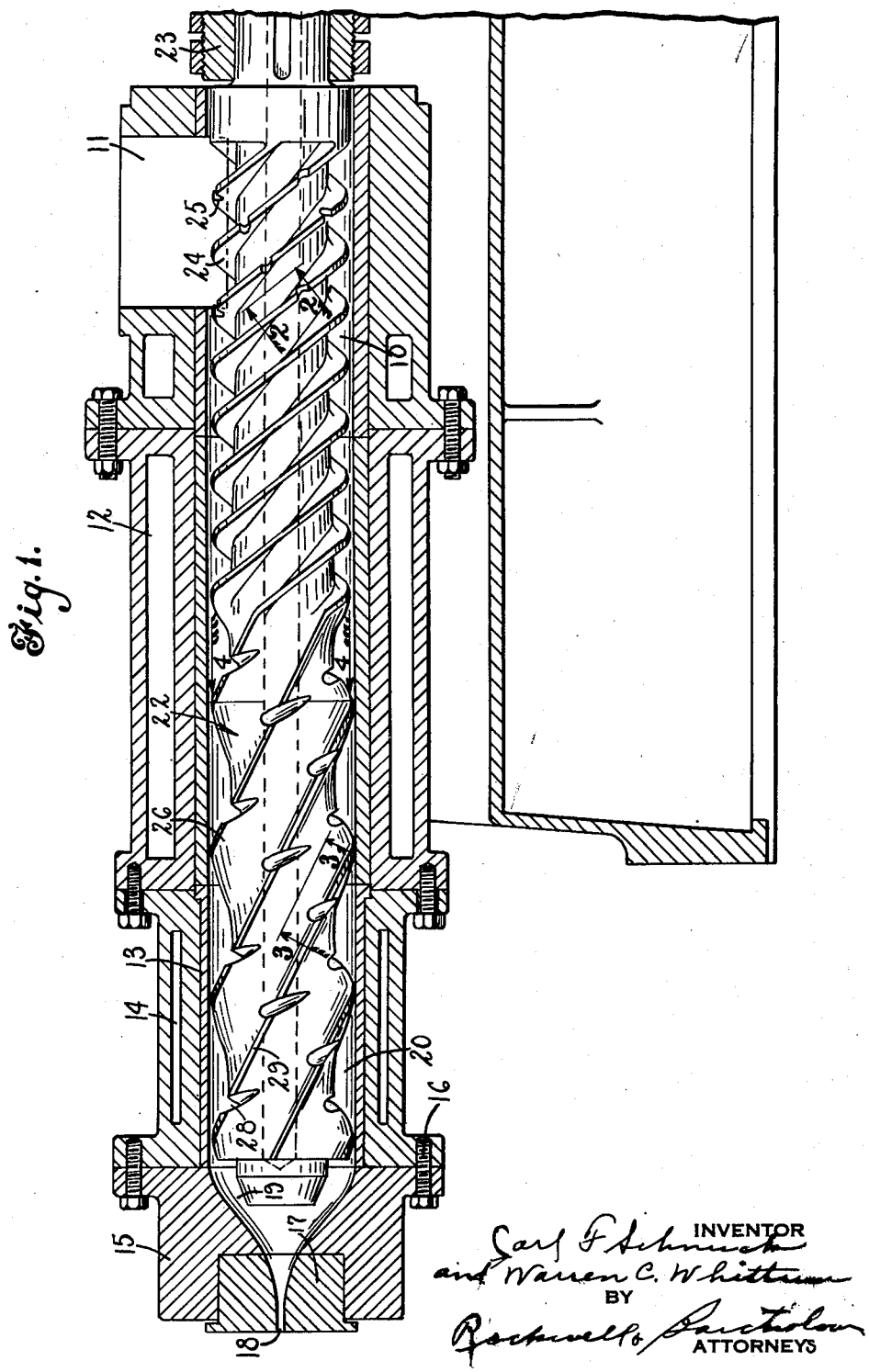
Fig. 1 is a sectional view of a machine for mixing or blending plastic materials embodying our invention.
Figure 2:
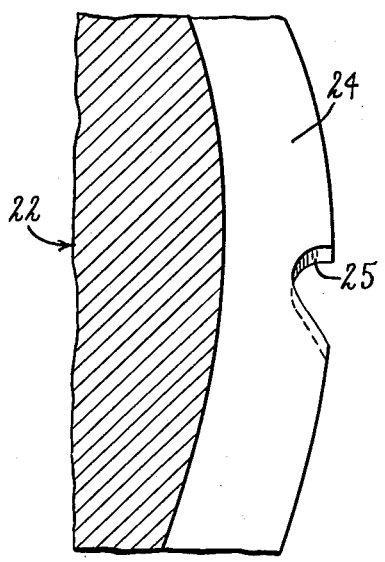
Fig. 2 is a partial sectional view of the rotor adjacent the hopper portion of the chamber taken on line 2—2 of Fig. 1.

To illustrate a preferred embodiment of our invention, we have shown in the drawings an apparatus for blending and mixing plastic products comprising a chamber 10 provided with an inlet or charging hopper 11 through which the material is introduced into the chamber. The latter may be provided with a jacket 12 into which a heat medium may be introduced so as to supply external heat to the material while it is under treatment if that is desired. The chamber is also shown as being provided with a forward portion 13 provided with a hollow jacket 14 serving the same purpose as the jacket 12.

At the front end of the chamber is a cap 15 which may be secued to the section 14 by bolts 16, the cap being provided with an end plug or die 17 having a discharge opening 18 through which the material is discharged from the chamber. The cap 15 is provided with a tapered passage 19 which communicates with the interior 20 of the mixing chamber at one end and with the opening 18 in the plug 17 at the other end.

Within the chamber is a rotor 22 which may be supported in bearings 23 and which may be rotated by any well-known means. This rotor is provided with a plurality of blades or threads and, as will presently appear, the configuration of the threads or blades upon one section of the rotor will differ from those upon the other section. Adjacent the the hopper the rotor is provided with a plurality of screw threads or blades 24, which blades are spirally arranged but having relatively low pitch so that they exert a powerful propelling action on the material to propel it toward the discharge end of the cylinder. In some instances it has been found that it is difficult to draw the material into the chamber as the latter has a tendency to regurgitate in the hopper unless it is positively drawn into the flutes between the threads or blades. For this purpose the ridges of the threads 24 are provided adjacent the hopper with a plurality of notches or serrations 25 so that the edges of these serrations will enter and bite into the mass of material and tend to grip the material and draw it down into the chamber to be worked therein.

Figure 4:
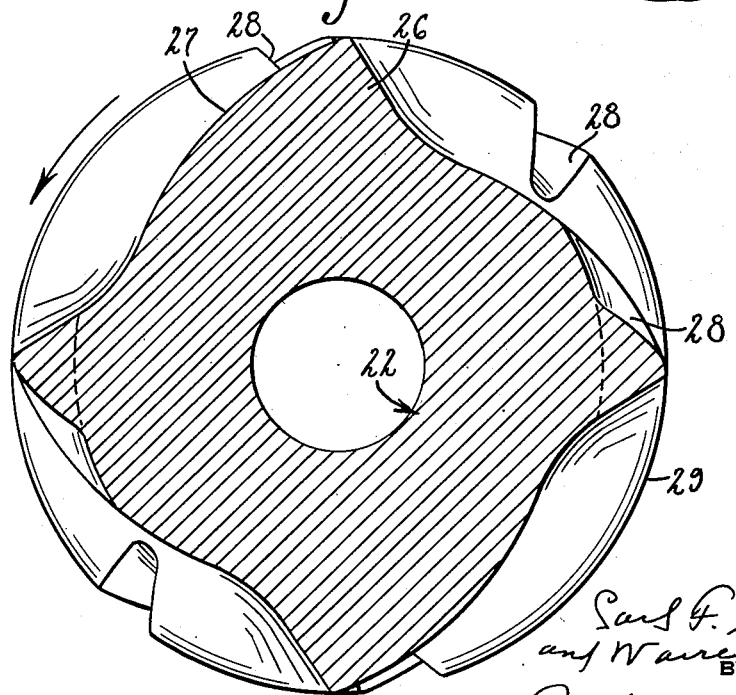
Fig. 4 is a transverse section of the rotor on line 4—4 of Fig. 1.

Adjacent the other end of the rotor the latter is provided with a plurality of blades 26, these blades being of convex form, as shown at 27 in Fig. 4, so as to effect a kneading action upon the material against the chamber wall. It may be noted that there are four of the screw threads or blades 24 upon the rotor and an equal number of blades 26, the former merging into the latter adjacent the central portion of the chamber. The portion of the rotor upon which the blades 26 are provided may, of course, be varied, if desired, and these blades carried a further or lesser distance along the length of the rotor as seems expedient. It will also be noted that the pitch of the blades 26 is much steeper than that of the blades 24, the former having a much longer lead.

Figure 3:
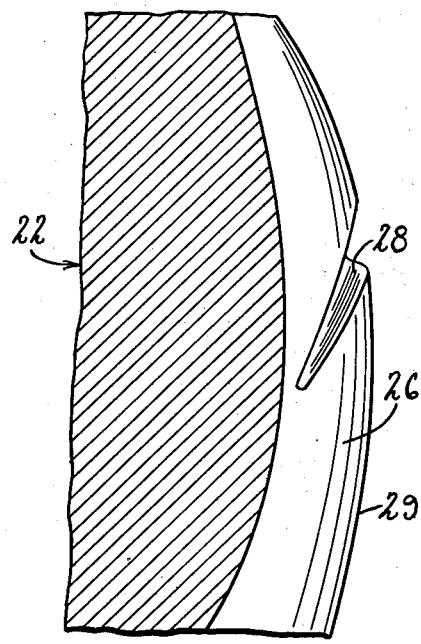
Fig. 3 is a partial sectional view of the mixing portion of the rotor taken on line 3—3 of Fig. 1.

A series of grooves 28 are cut across the ridges 29 of the blades 26, as shown particularly in Figs. 1 and 3. These grooves provide ports which afford communication between the flutes or channels on each side of the blade across which the groove extends.

As shown, a number of the grooves 28 are provided and the grooves themselves are directed helically, and in a forward direction, with respect to the axis of the rotor, these grooves, however, being cut on a lesser angle than that of the blades 26 so that they cross the ridges of the latter, and the lead of the grooves is such that there are a number of these grooves provided in each of the ridges of the blades so as to provide for a considerable interchange of material between the channels or flutes which lie between the blades. As shown, the rotor blades are provided with a 48 inch lead, for example, while the grooves are arranged on a 12 inch lead. Also, the grooves are provided on a double spiral or double thread arrangement so that the ridge of each of the four blades is crossed a number of times by the grooves.

It will be apparent, therefore, that the particular rotor construction shown provides for a thorough mixing and blending of the materials by permitting an interchange of material from one channel or flute to the next adjacent one, while at the same time it does not reverse the direction of the material in the chamber and consequently the operation is a purging one. That is, the material will all be expelled from the chamber at the end of a "run" and will not remain in the chamber to become mixed with the material of the following operation which might be of a different kind. The helical arrangement of the grooves in combination with the helical blades, but at a different angle, will effect a progressive cross mixing of the material, while it is being propelled forwardly both through the grooves and through the channels between the blades.

It will also be seen that by providing the serrations or notches 25 the edges of these serrations will bite into the charge of material in the hopper and draw it down into the chamber for the mixing and blending operation.

It will be understood that the invention is not limited to a device employing a plurality of blades 25 as in some instances a single thread screw may be used with as good or better results than a plurality of threads.

While we have shown and described a preferred embodiment of our invention, it will be understood that it is not to be limited to all of the details shown, but is capable of modification and variation within the spirit of the invention and within the scope of the claims.

What we claim is:

1. An apparatus for treating plastic materials comprising a chamber having inlet and outlet means, a rotor therein, said rotor being provided with helical blades to propel the material toward and through the outlet means, said blades providing helically extending channels between the ridges thereof, and means for effecting cross passage of the material from one channel to the next rearward channel during its travel through the chamber.

2. An apparatus for treating plastic materials comprising a chamber having inlet and outlet means, a rotor therein for propelling the material from the inlet to and through the outlet means, said rotor having helical blades thereon providing helical channels between the ridges thereof through which the material passes, and said blades working the material against the chamber wall and being provided with means to effect a progressive cross mixing of the material from one channel to a following channel during its travel through the chamber.

3. An apparatus for treating plastic materials comprising a chamber having inlet and outlet means, a rotor therein for propelling the material from the inlet to and through the outlet means, said rotor having helical blades thereon providing helical channels between the ridges thereof through which the material passes, and said blades working the material against the chamber wall and being provided with means to effect a progressive cross mixing of the material from one channel to a following channel during its travel through the chamber, said last-named means comprising grooves extending across the ridges of the blades to provide communication between adjacent channels.

4. A device for treating plastic material as set forth in claim 2 wherein the cross mixing of the material is effected by helically directed grooves extending across the ridges of the blades, and said grooves are pitched in the same direction as the blades but at a lesser angle.

5. A chamber having an inlet opening and an outlet opening, a hopper adjacent the inlet opening, a rotor in the chamber, said rotor being provided with helical blades adjacent the inlet opening to draw the material thereinto and propel it toward the outlet opening, the ridges of said blades being notched to engage the material in the hopper, and said rotor being provided adjacent the outlet opening with helically directed blades of a greater pitch than said first-named blades to mix the material and force it through the outlet opening, said last-named blades having grooves crossing the ridges thereof to effect progressive cross mixing of the material as it travels through the chamber, and said grooves being pitched in the same direction as said last-named blades but at a lesser angle.

6. A device for mixing plastic materials comprising a chamber having inlet and outlet openings, a rotor rotatably mounted within the chamber, said rotor having a plurality of screw-type blades upon the end thereof adjacent the inlet opening and a plurality of mixing and propelling helically directed blades upon the end thereof adjacent the outlet opening, said first-named blades merging into the last-named blades and being of a lesser pitch than said last-named blades, and means for effecting progressive cross mixing of the material as it is being propelled toward the outlet opening by said last-named blades, said means comprising grooves crossing the ridges of said last-named blades but at a lesser angle.

7. A device for treating plastic materials comprising a chamber having inlet and outlet openings, a rotor rotatably mounted in the chamber, said rotor having helically directed blades thereon adjacent the inlet opening and also having helically directed blades thereon adjacent the outlet opening, said last-named blades being of a greater pitch than said first-named blades, said last-named blades being provided with means for effecting a progressive cross mixing of the material as it is treated by said blades, said last-named means comprising helically directed grooves across the ridges of said blades, and said grooves being pitched in the same direction but having a lesser pitch than that of said blades.

8. An apparatus for treating plastic materials comprising a chamber having a charging opening and an outlet opening, a rotor in the chamber, said rotor being provided with conveying means thereon adjacent the charging opening to receive the material and force it toward the discharge opening, and said rotor being provided upon a considerable portion thereof adjacent the discharge opening with a plurality of helically disposed blades to continuously propel the material toward the discharge opening, said blades having convex front faces to work the material against the chamber wall, and said blades being provided with grooves crossing the ridges thereof to effect cross mixing of the material between the channels on each side of a blade and said grooves being pitched in the same direction as the blades but at a lesser angle.

References Cited in the file of this patent

UNITED STATES PATENTS

| Number | Name | Date |
| --- | --- | --- |
| 582,272 | Desgoffe et al. | May 11, 1897 |
| 2,431,274 | Osborne | Nov. 18, 1947 |

FOREIGN PATENTS

| Number | Country | Date |
| --- | --- | --- |
| 326,112 | Germany | Sept. 23, 1920 |
| 402,879 | Germany | Apr. 17, 1923 |